US010254556B2

(12) United States Patent
Bitauld

(10) Patent No.: US 10,254,556 B2
(45) Date of Patent: Apr. 9, 2019

(54) POLARIZATION ROTATOR-COMBINER FOR OPTICAL COMMUNICATIONS

(71) Applicant: Nokia Technologies Oy, Espoo (FI)

(72) Inventor: David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 213 days.

(21) Appl. No.: 15/306,191

(22) PCT Filed: Apr. 28, 2014

(86) PCT No.: PCT/US2014/035713
§ 371 (c)(1),
(2) Date: Oct. 24, 2016

(87) PCT Pub. No.: WO2015/167431
PCT Pub. Date: Nov. 5, 2015

(65) Prior Publication Data
US 2017/0045752 A1  Feb. 16, 2017

(51) Int. Cl.
*G02B 27/28* (2006.01)
*H04B 10/11* (2013.01)
*H04B 10/40* (2013.01)

(52) U.S. Cl.
CPC .......... *G02B 27/283* (2013.01); *H04B 10/11* (2013.01); *H04B 10/40* (2013.01)

(58) Field of Classification Search
CPC .... G02B 27/28; G02B 27/283; G02B 27/285; G02B 27/286; G02B 6/26; G02B 6/27; G02B 6/34; H04B 10/11–10/116; H04B 10/40; H04B 10/532; H04B 10/614; H04B 10/615; H04B 10/6151; H04B 10/6166
See application file for complete search history.

(56) References Cited

U.S. PATENT DOCUMENTS

| 5,689,367 A | 11/1997 | Pan et al. |
| 5,923,470 A | 7/1999 | Pan et al. |
| 6,856,459 B1 * | 2/2005 | Islam .................. G02B 6/272 |
| | | 250/227.12 |

(Continued)

FOREIGN PATENT DOCUMENTS

| CN | 1610850 A | 4/2005 |
| CN | 101170365 A | 4/2008 |

(Continued)

OTHER PUBLICATIONS

Sacher et al., "Polarization Rotator-Splitters in Standard Active Silicon Photonics Platforms", Optics Express, vol. 22, No. 4, 2014, pp. 3777-3786.

(Continued)

*Primary Examiner* — Stephone B Allen
*Assistant Examiner* — Adam W Booher
(74) *Attorney, Agent, or Firm* — Alston & Bird LLP

(57) ABSTRACT

An apparatus may include an optical combiner configured to combine a first optical beam having an adjusted first polarization with a second optical beam having an adjusted second polarization into an output beam having a third polarization. The third polarization may be a linear combination of the adjusted first polarization and the adjusted second polarization. Information may be communicated by adjusting the polarization according to an information source.

17 Claims, 7 Drawing Sheets

(56) References Cited

U.S. PATENT DOCUMENTS

| | | |
|---|---|---|
| 6,975,454 B1 | 12/2005 | Yan et al. |
| 7,702,188 B2 | 4/2010 | Little et al. |
| 2003/0090765 A1* | 5/2003 | Neff .................. H04B 10/1127 398/126 |
| 2005/0031350 A1* | 2/2005 | Haber ................ H04B 10/1127 398/128 |
| 2007/0291372 A1 | 12/2007 | Baselmans et al. |
| 2010/0158252 A1 | 6/2010 | Youn et al. |
| 2011/0310921 A1 | 12/2011 | Chann et al. |
| 2013/0101119 A1 | 4/2013 | Nordholt et al. |
| 2014/0001347 A1 | 1/2014 | Nagarajan et al. |
| 2014/0016199 A1 | 1/2014 | Dongling et al. |

FOREIGN PATENT DOCUMENTS

| | | |
|---|---|---|
| DE | 102009047471 A1 | 6/2011 |
| WO | 2013/179094 A1 | 12/2013 |
| WO | 2014/060793 A1 | 4/2014 |
| WO | 2015/092479 A1 | 6/2015 |

OTHER PUBLICATIONS

Office action received for corresponding Chinese Patent Application No. 201480078504.3, dated Mar. 15, 2018, 5 pages of office action and 3 pages of translation available.

International Search Report and Written Opinion received for corresponding Patent Cooperation Treaty Application No. PCT/US2014/035713, dated Mar. 23, 2015, 14 pages.

* cited by examiner

POLARIZATION ROTATOR-COMBINER FOR OPTICAL COMMUNICATIONS

RELATED APPLICATION

This application was originally filed as Patent Cooperation Treaty Application No. PCT/US2014/035713 filed Apr. 28, 2014.

The subject matter described herein relates to optical communications, and in particular, free-space optical communications for mobile devices.

BACKGROUND

Electronic devices may connect to other electronic devices in order to share data. Some data connections are through a cable with connectors on each end that couple with connectors in the electronic devices to share data between the devices. Some data connections are wireless allowing a data connection between devices that does not require a cable. Optical communications may be done through a fiber-optic cable or may be done through free-space. Electronic devices that require data to be shared include a wide variety of consumer and industrial products including mobile devices such as cell phones, handheld computing devices, laptops, and the like. As the features and capabilities available in mobile devices has increased, the need for higher throughput data connections has also increased. For example, sharing high-definition video with another device via a data connection requires a high-throughput data connection between the devices.

SUMMARY

In one aspect, there is an apparatus. The apparatus may include an optical combiner configured to combine a first optical beam having an adjusted first polarization with a second optical beam having an adjusted second polarization into an output beam having a third polarization. The third polarization may be a linear combination of the adjusted first polarization and the adjusted second polarization.

In some variations, one or more of the features disclosed herein including the following features may optionally be included in any feasible combination. The optical combiner may include a first transparent surface. Input beams including a first optical beam with a first polarization and a second optical beam with a second polarization may enter the optical combiner at the first transparent surface. A first reflective surface may reflect the first optical beam and rotate the first polarization to the adjusted first polarization, wherein the first optical beam propagates through the optical combiner from the first transparent surface to the first reflective surface. A second reflective surface may reflect the second optical beam and rotate the second polarization to the adjusted second polarization, wherein the second optical beam propagates through the optical combiner from the transparent surface to the second reflective surface. A partially reflective surface may combine the first beam with the adjusted first polarization and the second beam with the adjusted second polarization into the output beam. The optical combiner may include at least one second transparent surface, wherein the output beam exits the optical combiner at the at least one second transparent surface. In some embodiments, the first polarization of the first optical beam may be approximately the same as the second polarization of the second beam.

The first reflective surface may lie at a first angle of approximately forty-five degrees to the first optical beam. The second reflective surface may lie at a second angle of approximately forty-five degrees to the second optical beam. The first and second reflective surfaces may be joined at an edge at a third angle of approximately ninety degrees. The partially reflective surface may lie between the edge joining the first and second reflective surfaces and the first transparent surface. A fourth angle between the partially reflective surface and the first transparent layer may be approximately ninety degrees.

Digital or analog information may be added to the third polarization by adjusting at least one of a phase or an amplitude of the first optical beam and the second optical beam. The digital or analog information may also be carried in a polarization of the third polarization. In some embodiments, the apparatus may be included in a free-space optical transceiver that communicates information to and from another free-space optical transceiver. In some embodiments, the apparatus may be included in a user equipment that sends a message to a network indicating that the user equipment has an optical communication capability. In some embodiments, the apparatus may be configured to receive an indication from a network node that enables optical communication between the user equipment and another device.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Figure 1:
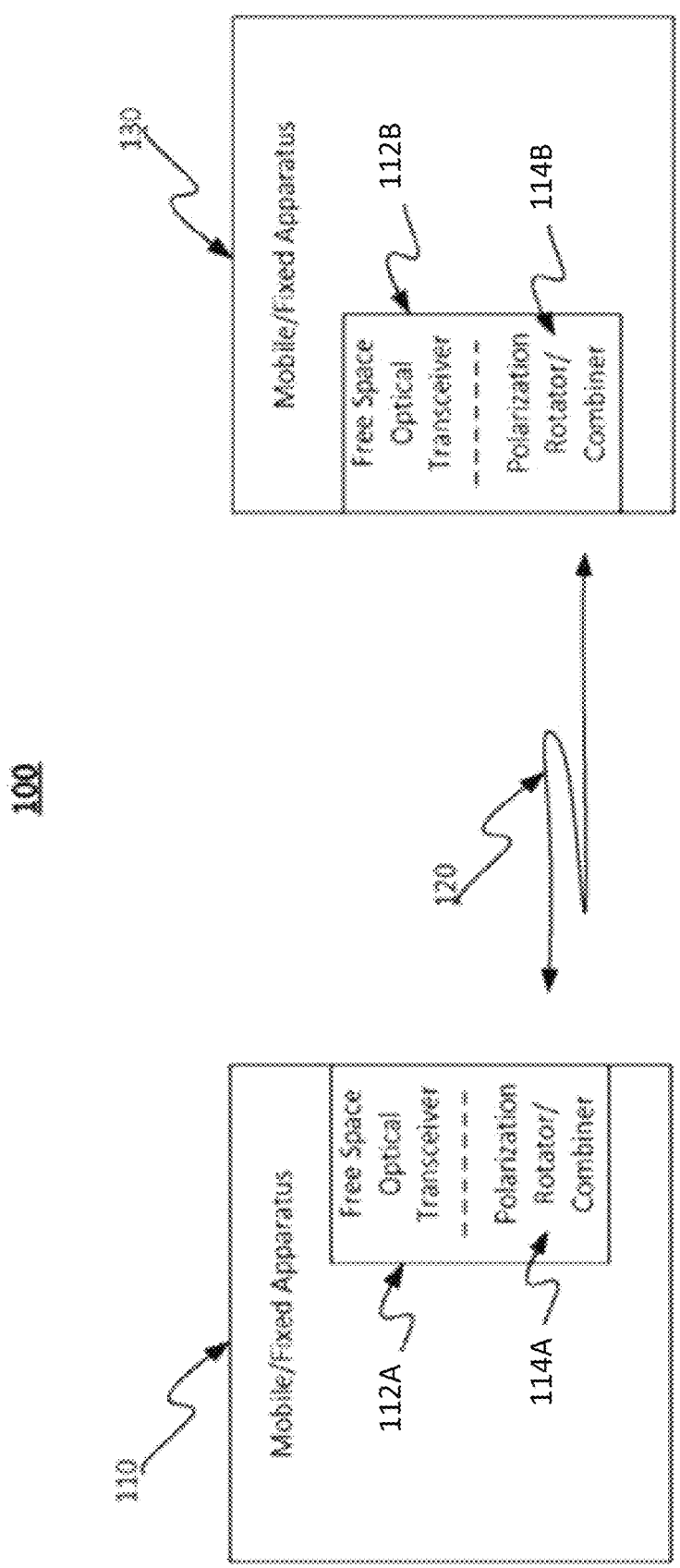
FIG. 1 depicts an example of a system including a free-space optical transceiver with polarization rotator-combiner sending data between two apparatus, in accordance with some example embodiments.

Like labels are used to refer to same or similar items in the drawings.

DETAILED DESCRIPTION

Electronic devices such as cell phones, portable computers, gaming devices, and the like often share data with other mobile devices or fixed location devices. The increased data generating and processing capabilities of mobile and fixed devices has created an increased demand for high-throughput optical data communications. Optical communications can be implemented using a cabled such as a fiber optic cable or without a cable such as free-space optical communications. The polarization rotator-combiner disclosed herein may be included in cabled or cable-less optical communications. In some situations, cables are inconvenient or prone to failure because they require connecting and disconnecting connectors that can break or become dirty interfering with their operation, and so on. In some situations, free-space optical communications are more robust and convenient. Free-space optical communications may be performed from an optical transmitter to an optical receiver through an open medium such as through air from a mobile device to another device.

In some example embodiments, an optical transceiver may be integrated into a small package suitable to being incorporated into a small wireless device or user equipment, such as a smart phone, or a cell phone, and/or any other radio. In some example embodiments, a free-space optical transceiver may include a polarization rotator-combiner. The polarization rotator-combiner may combine two polarized input beams into one or more output beams with polarization that is dependent on the polarization of the input beams and the amplitude and phase of the two input beams. For example, by adjusting the amplitudes of two linearly polarized input beams, the polarization of the output beam may be changed. By adjusting the amplitudes of the two input beams according to an information source such as digital data or analog data (e.g., analog audio), the information carried by the information source may be added to an output beam of a rotator-combiner. In this way, some embodiments add digital or analog information to the output beam based on the input beams.

In some embodiments, the polarization rotator-combiner may be included in communications transceiver implementing a quantum key distribution. For example, single photons may be transmitted and received according to a quantum key distribution to provide secure communications. The polarization rotator-combiner may be used in any other type of optical communications transceiver as well.

In some embodiments, the polarization rotator-combiner may be included in an ellipsometer. For example, the polarization rotator-combiner disclosed herein may be used to analyze a change of polarization upon reflection or transmission of incident light from a sample material. The polarization rotator-combiner may be used in other tools or test equipment as well.

In some embodiments, a phase difference between the two input beams may be added to produce an output beam that is elliptically or circularly polarized. In some embodiments, a phase difference may be produced by a coating that one of the input beams passes through. In some embodiments, information may be added to an input beam by using an active device to adjust the phase according to an analog or digital information source.

In some embodiments, the relative amplitudes of the two input beams may determine a linear polarization angle between two axes that are orthogonal. For example, when one polarized input beam has a high amplitude and the other input beam has a low amplitude, the output beam may have a polarization corresponding to the high amplitude input beam. In another example, when the amplitude of one input beam may be nearly equal to the amplitude of the other input beam, the polarization of the output beam may be approximately mid-way between the polarizations generated when each beams has the dominant amplitude.

In some embodiments, the polarization rotator-combiner may be used to generate a polarized output beam according to the input beams and an information source. In some embodiments, the polarization rotator-combiner may be used to analyze the polarization of a beam received from a transmitter in order to determine the information carried by the transmitted beam.

FIG. 1 depicts an example of a system 100 including two apparatus, each apparatus including a free-space optical transceiver for communications between the two apparatuses, in accordance with some example embodiments. The free-space optical transceivers may include a polarization rotator-combiner. A mobile or fixed apparatus 110 may include a free-space optical transceiver 112A that includes polarization rotator-combiner 114A, and a second mobile or fixed apparatus 130 may also include a free-space optical transceiver 112B that includes another polarization rotator-combiner 114B. Apparatus 110 and apparatus 130 may communicate via free-space optical transceivers 112A/B and polarization rotator-combiners 114A/B through a medium 120 such as air or any other medium.

Mobile/fixed apparatus 110 may be any type of electronic apparatus, such as a user equipment, a smart phone, a cell phone, a mobile computing device, a computer, and the like. For example, apparatus 110 may be a mobile telephone with free-space optical transceiver 112A including polarization rotator-combiner 114A integrated into the mobile telephone. Free-space optical transceiver 112A including polarization rotator-combiner 114A may be configured to send and/or receive any type of data including digital data and analog data. For example, free-space optical transceiver 112A may send and/or receive any type of digital data including interne protocol data, digitized video data, digitized audio data, configuration data for mobile apparatus 110, and so on. Free-space optical transceiver 112A including polarization rotator-combiner 114A may send and/or receive analog signals such as video signals including National Television System Committee (NTSC) video, analog audio, and any other type of analog information.

Apparatus 130 may be any type of electronic apparatus such as another user equipment, smart phone, cell phone, mobile computing device, computer, and the like. For example, apparatus 130 may be another mobile telephone with free-space optical transceiver 112B including polarization rotator-combiner 114B integrated into apparatus 130. Free-space optical transceiver 112B including polarization rotator-combiner 114B may be configured to send and/or receive any type of data including digital data and analog data.

Mobile/fixed apparatus 110 may communicate with mobile/fixed apparatus 130 through medium 120. In some embodiments, medium 120 is the air found in the space separating mobile/fixed device 110 from mobile/fixed device 130. In some embodiments, the medium may be composed of one or more other materials such as water, empty space (such as outside Earth's atmosphere), slabs of optical material, or optical fibers, or may be composed of a combination of materials.

Figure 2:
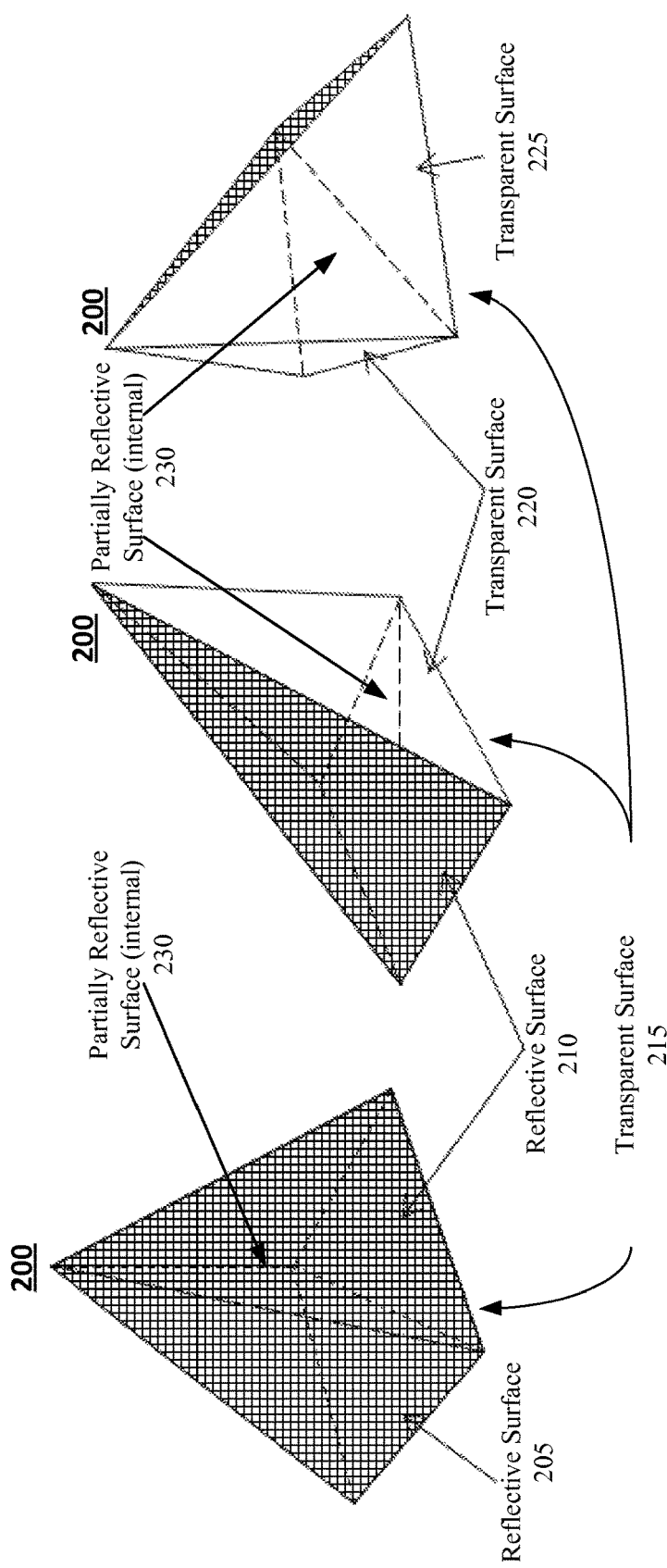
FIG. 2 depicts example views of a single-element polarization rotator-combiner, in accordance with some example embodiments.

FIG. 2 depicts three example views of single-element polarization rotator-combiner 200, in accordance with some example embodiments. In some embodiments, single-element polarization rotator-combiner may combine two polarized optical input beams into at least one output beam wherein the polarization of the output beam is dependent on the amplitudes of the input beams. In some embodiments, single-element rotator-combiner 200 may be a solid object with five external surfaces 205, 210, 215, 220, and 225, and one internal surface 230.

Rotator-combiner 200 may be implemented using a solid material that is optically transparent in a range of wavelengths the rotator-combiner is designed to operate. For example, rotator-combiner 200 may include one or more geometric blocks of a glass material that is transparent over the visible range of wavelengths. In some embodiments, rotator-combiner 200 may be produced by gluing two blocks together at partially reflective surface 230. In some embodiments, the surfaces of the geometric blocks of glass may be planar. In some embodiments, a coating may be placed on one or more of the surfaces.

On one or more surfaces of the solid transparent material a metallic coating may be attached to cause the surface to be reflective, such as reflective surfaces 205 and 210. Any or a variety of techniques may be used to attach the metallic coating including sputtering, vapor deposition, or gluing a metal film to the appropriate surface, or any other attachment or deposition process may be used. Reflective surfaces 205, 210 reflect light that has propagated in rotator-combiner 200 to the reflective surfaces 205, 210. In some embodiments, reflective surface 205 and 210 may have a common edge. In some embodiments, reflective surfaces 205 and 210 may meet at an angle of approximately ninety degrees.

One or more other surfaces of the rotator-combiner 200 may be transparent with no reflective coating. In some embodiments, the transparent surfaces may have an anti-reflective or other coating. In some embodiments, the transparent surfaces include transparent surfaces 215, 220, and 225.

Internal surface 230 may be a partially reflective surface. In some embodiments, partially reflective surface 230 may reflect approximately one-half of an incident intensity and may allow approximately one-half of the incident intensity to pass through the partially reflective surface 230. A partially reflective surface such as surface 230 may sometimes be referred to as a beamsplitter. Partially reflective surface 230 may have little or no effect on the polarization of a reflected and passed beams, when compared to a beam incident on surface 230.

Figure 3:
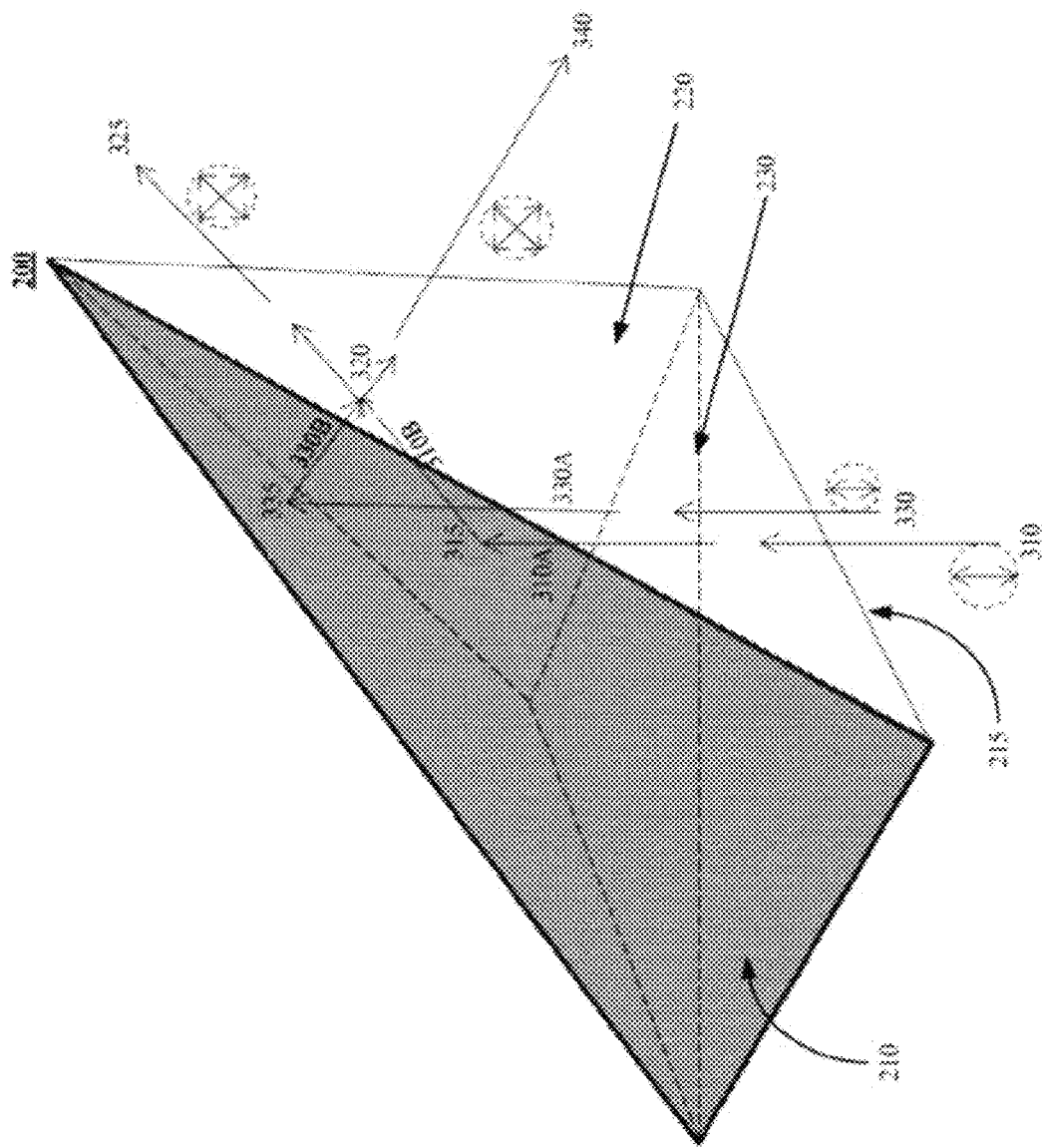
FIG. 3 depicts another example view of a single-element rotator-combiner showing the paths of optical beams through the element, in accordance with some example embodiments.

FIG. 3 depicts another example view of a single-element rotator-combiner 200 showing the paths of optical beams through the element, in accordance with some example embodiments. Two optical input beams may enter the rotator-combiner at a transparent surface. The input beams may be reflected by reflective surfaces toward a partially reflective surface. The beams may combine at the partially reflective surface to produce an output beam that has an amplitude (or intensity) and polarization proportional to the two input beams. FIG. 3 includes one or more features detailed with respect to FIG. 2.

Optical input beams 310 and 330 may enter rotator-combiner 200 at transparent surface 215. Transparent surface 215 is shown as the bottom surface of 200. The optical input beams 310 and 330 may be linearly polarized in the same orientation such as vertically polarized as shown in FIG. 3. Input beams 310 and 330 may enter rotator-combiner 200 without affecting the polarization of 310 or 330 and propagate in rotator-combiner 200 as beams 310A and 310B.

Optical beam 310A may be reflected by reflective surface 210 at 315. Due to surface 210 being reflective and the angle between beam 310A and reflective surface 210, the reflected beam 310B may have a polarization that is rotated by approximately forty-five degrees compared to beam 310A. Beam 310B may be directed toward 320 at partially reflective surface 230.

Similar to optical beam 310A, optical beam 330A may be reflected by reflective surface 205 at 335. Due to surface 205 being reflective and the angle between beam 330A and reflective surface 205, the reflected beam 330B may have a polarization that is rotated by approximately forty-five degrees compared to beam 330A. Due to the geometric orientation of reflective surface 205 relative to reflective surface 210, an additional ninety degrees of polarization rotation may occur. In this way, the polarization of beam 310B may be normal to, or rotated ninety degrees from, the polarization of beam 330B. Beam 330B may be directed toward 320 at partially reflective surface 230.

Reflected beams 310B and 330B may be incident on partially reflective surface 230 at point 320. In some embodiments, the angle of incidence between partially reflective surface 230 and reflected beam 310B may be forty-five degrees. In some embodiments, the angle of incidence between partially reflective surface 230 and reflected beam 330B may also be forty-five degrees. The angle between reflected beams 310B and 330B at 320 may be ninety degrees. Due to these angles and spatial arrangement, the portion of beam 310 that is reflected by partially reflective surface 230 may be combined with the portion of beam 330B that is passed through partially reflective surface 230 to produce output beam 340. The portion of beam 310B that is passed by partially reflective surface 230 may be combined with the portion of beam 330B that is reflected by partially reflective surface 230 to produce output beam 325.

In some embodiments, the intensity of output beam 325 may be approximately the sum of the intensity of input beam 310 that is passed through partially reflective surface 230 and the intensity of input beam 330 that is reflected at partially reflective surface 230. In some embodiments, the intensity of reflected beam 310A may be approximately equal to input beam 310 when the attenuation in the material of rotator-combiner 200 is negligible and when the intensity reflected at entry surface 215 is negligible (e.g. with use of an anti-reflection coating). In some embodiments, the intensity of beam 310B is approximately equal to beam 310A when reflective surface 210 is lossless.

In some embodiments, the intensity of output beam 340 may be approximately the sum of the intensity of input beam 340 that is passed through partially reflective surface 230 and the intensity of input beam 310 that is reflected at partially reflective surface 230. In some embodiments, the intensity of reflected beam 330A may be approximately equal to input beam 330 when the attenuation in the material of rotator-combiner 200 is negligible and when the intensity reflected at entry surface 215 is negligible. In some embodiments, the intensity of beam 330B may be approximately equal to beam 330A when reflective surface 205 is lossless.

Figure 4:
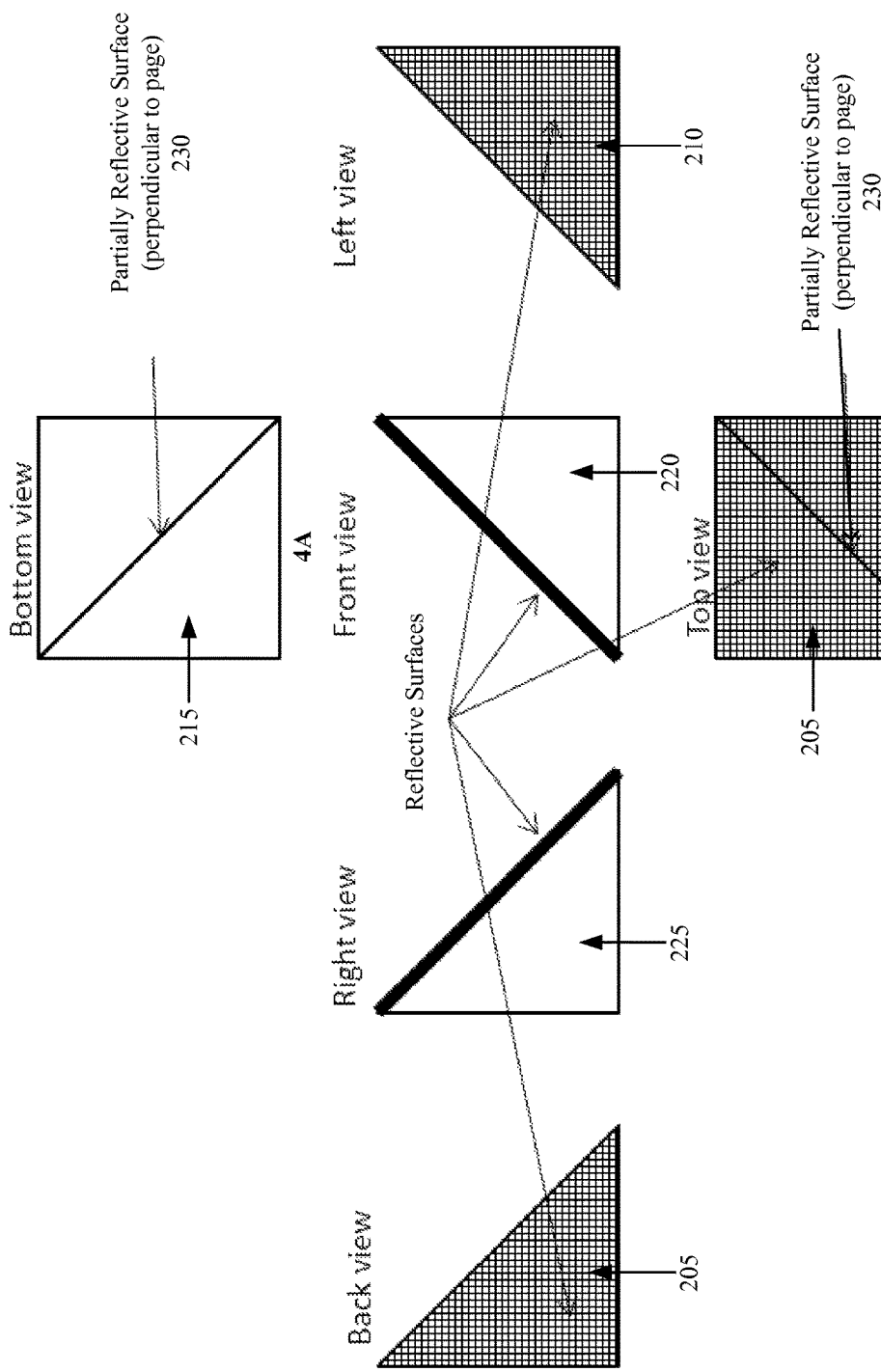
FIG. 4 depicts additional example views of a single-element rotator-combiner, in accordance with some example embodiments.

FIG. 4 depicts additional example views of a single-element rotator-combiner, in accordance with some example embodiments. FIG. 4 includes one or more features detailed with respect to FIGS. 2 and 3.

Reflective surfaces 205 and 210 may be created with metallic coatings attached to the optically transparent material. In some embodiments, instead of a coating total internal reflection at the surface may be used. For example, when the angle of incidence of a beam such as beam 310A or 330A exceeds a critical angle, the beam may be reflected at the surface such as 205 or 210 without a coating. The critical angle is dependent on the refractive index of the optically transparent material and the refractive index of the material outside the transparent material (e.g. air). The angle of incidence may be measured as the angle of the incoming beam, such as beam 310 with respect to a normal to the surface such as surface 210.

Transparent surfaces 215, 220, and 225 are depicted in FIG. 4. Transparent surface 215 shown in 4A corresponds to the entry surface for optical beams 310 and 330. Partially reflective surface 230 may be perpendicular to the entry surface 215 (and the page of FIG. 4). FIG. 4 at 4B depicts the partially reflective surface 230 along the diagonal edge between reflective surfaces 205 and 210.

Figure 5:
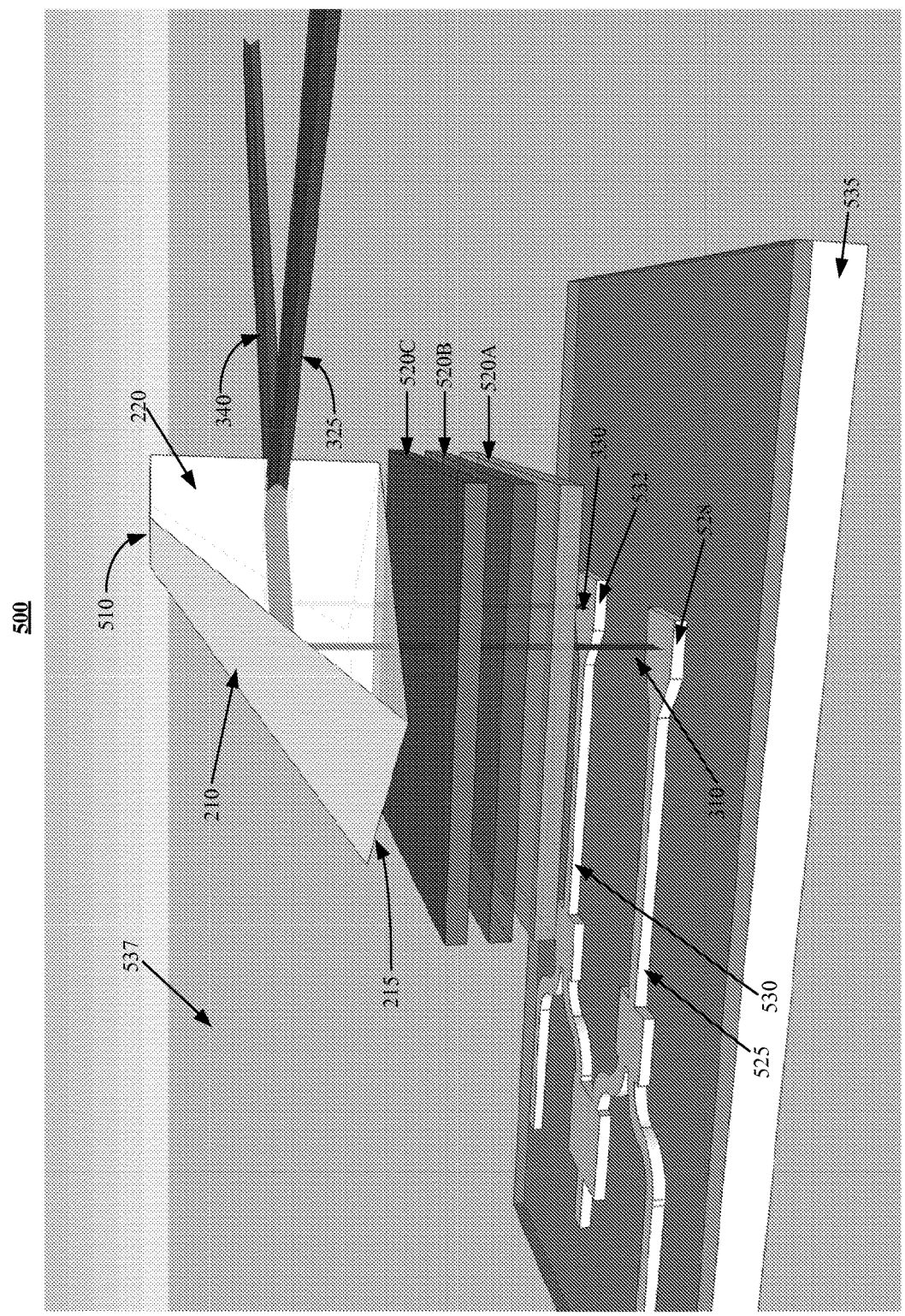
FIG. 5 depicts an example optical system including a single-element rotator-combiner, in accordance with some example embodiments.

FIG. 5 depicts an example optical system 500 including a single-element rotator-combiner 510, in accordance with some example embodiments. Optical system 500 may also include optical waveguides and transition structures to cause two optical beams to transition from the waveguides toward single-element rotator-combiner 510. Single-element rotator-combiner may produce two output beams. FIG. 5 includes one or more features detailed with respect to FIGS. 2, 3, and 4.

Optical beams may propagate in waveguides 525 and 530 toward transitions 528 and 532. Waveguides 525 and 530 may be produced on substrate 535 surrounded by material 537. In some embodiments, material 537 may be optically transparent and may be rigid enough to hold substrate 535 and layers 520A/B/C in position. Waveguides 525 and 530 may be composed of any optically transparent material and in some embodiments may be deposited and later etched using semiconductor processing techniques including photolithography and vapor deposition. Other techniques may be used as well.

Transition structures 528 and 532 may cause the optical beams propagating in waveguides 525 and 530 to exit the waveguides and propagate toward the single-element rotator-combiner 510.

In some embodiments, beams 310 and 330 may be polarized upon exiting transition structures 528 and 532. After exiting the transition structures, the beams may propagate through material 537 and layers 520A/B/C to single-element rotator-combiner 510 without change to the polarization of the beams. In some embodiments, beams 310 and 330 may not be polarized upon exiting transition structures 528 and 532. After exiting the transition structures, the beams may propagate through material 537.

Layer 520A may include a wavelength (or frequency) conversion layer. For example, layer 520A may convert light passing through 520A with a wavelength of approximately 1550 nanometers to light with a wavelength of 775 nanometers. Layer 520B may include a filter to filter-out or remove light with a particular wavelength or in a range of wavelengths. For example, layer 520B may filter-out light with a wavelength of approximately 1550 nanometers. Layer 520C may include an attenuator to reduce the intensity of light passing through layer 520C. For example, attenuator 520C may attenuate the light passing through layer 520C to the level of individual photons. Layers 520A/B/C may also include a polarization layer to cause beams 310 and 330 to become polarized, so that the beams entering single-element rotator-combiner are polarized.

Single-element rotator-combiner 510 may have the same characteristics as the single-element rotator-combiner disclosed with respect to FIGS. 2, 3, and 4. Single-element rotator-combiner 510 may include reflective surfaces 210 and 205 (not visible in FIG. 5), transparent surface 215 for input beam entry, partially reflective layer 230 (not visible in FIG. 5), and output surfaces including transparent surfaces 220 and 225. Single-element rotator-combiner 510 may produce output beams 325 and 340.

Figure 6:
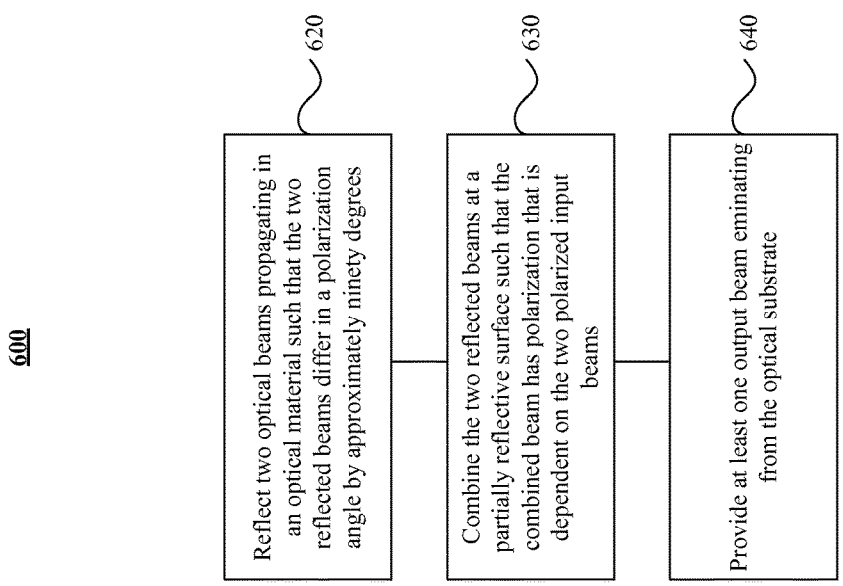
FIG. 6 depicts an example of a process performed by a single-element rotator-combiner, in accordance with some example embodiments.

FIG. 6 depicts an example of a process 600 performed by a single-element rotator-combiner, in accordance with some example embodiments. FIG. 6 includes one or more features detailed with respect to FIGS. 2, 3, 4, and 5.

At 620, two optical beams that are propagating in an optical material may be reflected such that the two reflected beams differ in a polarization angle by approximately ninety degrees. For example, linearly polarized beams 310 and 330 may enter polarization rotator-combiner 200 through surface 215. Beam 310 may be reflected at 315 on reflective surface 210. Beam 330 may be reflected at 335 on reflective surface 205. Due to the geometry of the rotator combiner 200 and reflective surfaces 205 and 210, the polarization of reflected beam 310B may be rotated by ninety degrees compared to reflected beam 330B.

At 630, beams 310B and 330B may be combined at 320 on partially reflective surface 230. The combined beam may have polarization that is dependent on the two polarized input beams. The portion of beam 310B that is reflected by partially reflective surface 230 may be combined with the portion of beam 330B that is passed through partially reflective surface 230 to produce output beam 340. The portion of beam 310 that is passed by partially reflective surface 230 may be combined with the portion of beam 330B that is reflected by partially reflective surface 230 to produce output beam 325.

At 640, at least one output beam emanates from the material of the rotator-combiner.

Figure 7:
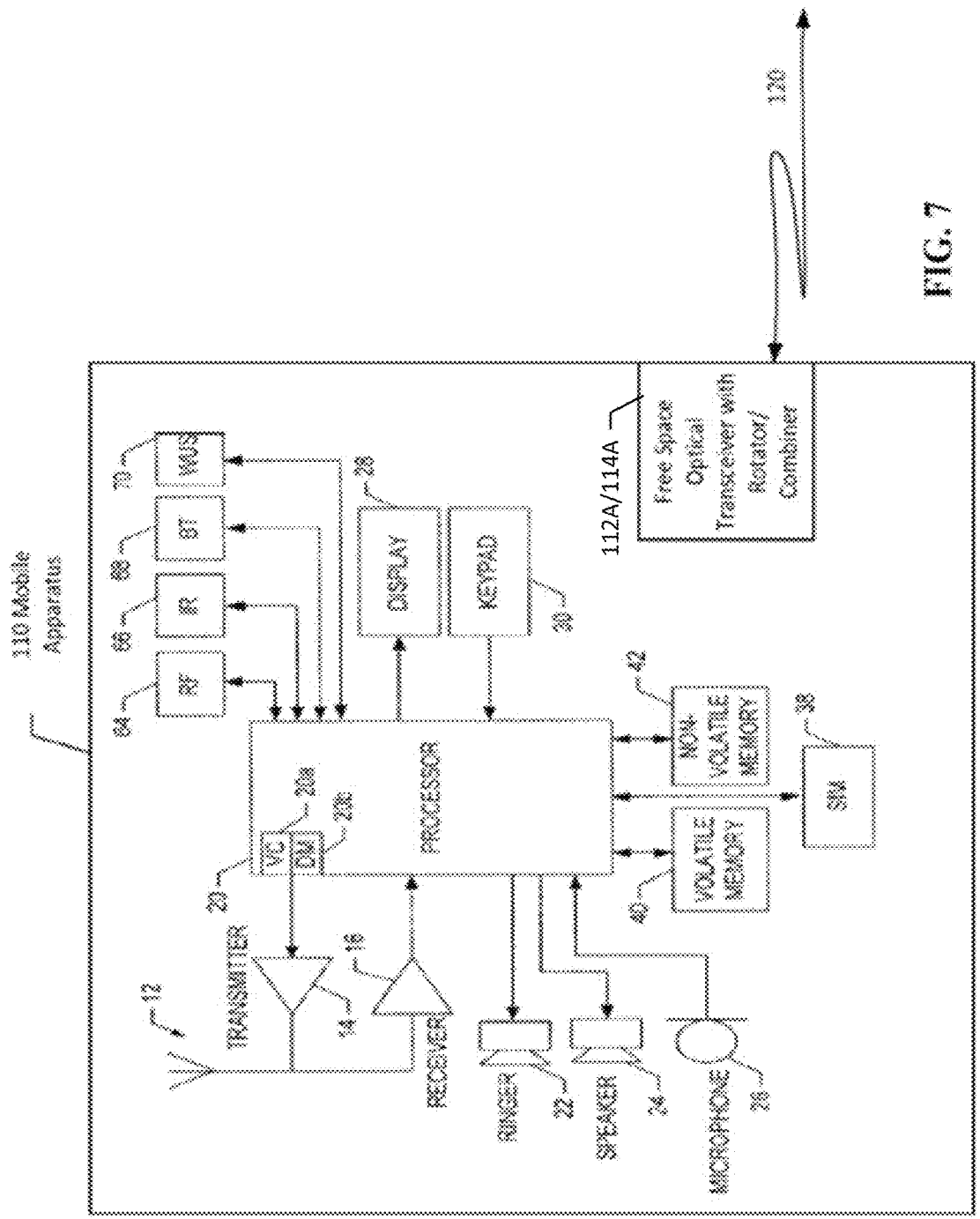
FIG. 7 depicts an example of an apparatus, in accordance with some example embodiments.

FIG. 7 depicts an example of an apparatus, in accordance with some example embodiments. The apparatus 110 may comprise a user equipment, such as a cellular telephone, a smartphone, and/or any other radio including mobile and stationary radios.

In some example embodiments, the apparatus 110 may include a free-space optical transceiver 112A and single-element rotator-combiner 114A that may couple to another free-space optical transceiver in another apparatus such as apparatus 130 in FIG. 1. In some example embodiments, apparatus 130 may be implemented in a manner similar to apparatus 110.

In some example embodiments, apparatus 110 may establish communications to another apparatus, such as apparatus 130, using optical transceivers 112A/B and single-element rotator-combiners 114A/B without utilizing a cellular service or other communications method between apparatus 110 and another apparatus such as apparatus 130.

In some example embodiments, apparatus 110 may also include a radio communication link to a cellular network, or other wireless network. Apparatus 110 may send a message to a network node of the radio network indicating the capabilities of apparatus 110. For example, apparatus 110 may indicate to the network node that its capabilities include the capabilities of optical transceiver 112A/114A. The network node may enable the apparatus 110 to use its optical transceiver 112A/114A and/or the network node may request that apparatus 110 forward information from the network node or from apparatus 110 to another apparatus such as apparatus 130. For example, the user of apparatus 110 may have information such as video or audio information that the user of apparatus 110 would like to send to apparatus 130. The network node may enable and/or command apparatus 110 to send the information using optical transceiver 112/114 to apparatus 130 rather than using the radio network.

The apparatus 110 may include at least one antenna 12 in communication with a transmitter 14 and a receiver 16. Alternatively transmit and receive antennas may be separate.

The apparatus 110 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 130 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 110 may include a location processor and/or an interface to obtain location information, such as positioning and/or navigation information. Accordingly, although illustrated in FIG. 7 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 110 may be capable of operating with one or more air interface standards, communication protocols, modulation types, access types, and/or the like. For example, the apparatus 110 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 110 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 110 may be capable of operating in accordance with 2.5G wireless communication protocols General Packet Radio Service (GPRS), Enhanced Data GSM Environment (EDGE), and/or the like. Further, for example, the apparatus 110 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 130 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 110 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 110. For example, the processor 20 may comprise a digital signal processor device, a microprocessor device, an analog-to-digital converter, a digital-to-analog converter, and/or the like. Control and signal processing functions of the apparatus 110 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 110 to perform actions. For example, processor 20 may be capable of operating a connectivity program, such as, a web browser. The connectivity program may allow the apparatus 110 to transmit and receive web content, such as location-based content, according to a protocol, such as, wireless application protocol, WAP, hypertext transfer protocol, HTTP, and/or the like.

Apparatus 110 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 110 may include a battery for powering various circuits related to the mobile terminal, for example, a circuit to provide mechanical vibration as a detectable output. The user input interface may comprise devices allowing the apparatus 110 to receive data, such as, a keypad 30 (which can be a virtual keyboard presented on display 28 or an externally coupled keyboard) and/or other input devices.

Moreover, the apparatus 110 may include a short-range radio frequency (RF) transceiver and/or interrogator 64, so data may be shared with and/or obtained from electronic devices in accordance with RF techniques. The apparatus 110 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 110 and, in particular, the short-range transceiver may be capable of transmitting data to and/or receiving data from electronic devices within a proximity of the apparatus, such as within 10 meters. The apparatus 110 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 110 may comprise memory, such as, a subscriber identity module (SIM) 38, a removable user identity module (R-UIM), and/or the like, which may store information elements related to a mobile subscriber. In addition to the SIM, the apparatus 110 may include other removable and/or fixed memory. The apparatus 110 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 110. The functions may include one or more of the operations disclosed herein with respect to free-space optical communications including the process flow of FIG. 6, and the like. The memories may comprise an identifier, such as, an international mobile equipment identification (IMEI) code, capable of uniquely identifying apparatus 110. In the example embodiment, the processor 20 may be configured using computer code stored at memory 40 and/or 42 to provide the operations disclosed with respect to the process shown in FIG. 6 and the like.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 3, 4, 6 and/or 7. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process of FIG. 6, and the like).

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although some of the examples described herein refer to the use of specific technologies, such as LTE, Wi-Fi, and the like, the subject matter described herein is not limited to those technologies, and, as such, can be used with other radio technologies as well.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. An apparatus comprising:
    an optical combiner configured to combine a first optical beam having an adjusted first polarization with a second optical beam having an adjusted second polarization into an output beam having a third polarization, wherein the third polarization is a linear combination of the adjusted first polarization and the adjusted second polarization;
    wherein the optical combiner comprises:
    a first transparent surface, wherein the first optical beam with a first polarization and the second optical beam with a second polarization enter the optical combiner at the first transparent surface;

a first reflective surface to reflect the first optical beam and rotate the first polarization to the adjusted first polarization, wherein the first optical beam propagates through the optical combiner from the first transparent surface to the first reflective surface;

a second reflective surface to reflect the second optical beam and rotate the second polarization to the adjusted second polarization, wherein the second optical beam propagates through the optical combiner from the first transparent surface to the second reflective surface, and wherein the second reflective surface is joined at an edge with the first reflective surface;

a partially reflective surface to combine the first beam with the adjusted first polarization and the second beam with the adjusted second polarization into the output beam; and at least one second transparent surface, wherein the output beam exits the optical combiner at the at least one second transparent surface.

2. The apparatus of claim 1, wherein the first reflective surface lies at a first angle of approximately forty-five degrees to the first optical beam, wherein the second reflective surface lies at a second angle of approximately forty-five degrees to the second optical beam, wherein the first and second reflective surfaces are joined at the edge at a third angle of approximately ninety degrees, wherein the partially reflective surface lies between the edge joining the first and second reflective surfaces and the first transparent surface, and wherein a fourth angle between the partially reflective surface and the first transparent layer is approximately ninety degrees.

3. The apparatus of claim 1, wherein digital or analog information is added to the third polarization by adjusting at least one of a phase or an amplitude of the first optical beam and the second optical beam.

4. The apparatus of claim 3, wherein the digital or analog information is carried in a polarization of the third polarization.

5. The apparatus of claim 1, wherein a free-space optical transceiver comprises the apparatus, and wherein the free-space optical transceiver communicates information to and from another free-space optical transceiver.

6. The apparatus of claim 1, further comprising:
a user equipment, wherein the user equipment sends a message to a network indicating that the user equipment has an optical communication capability.

7. The apparatus of claim 6, wherein the apparatus is further configured to receive an indication from a network node, wherein the indication enables optical communication between the user equipment and another device.

8. The apparatus of claim 1, wherein the first reflective surface lies at a first angle acute to the first optical beam, and wherein the second reflective surface lies at a second angle acute to the second optical beam.

9. A method comprising:
combining, at an optical combiner, a first optical beam having an adjusted first polarization with a second optical beam having an adjusted second polarization into an output beam having a third polarization, wherein the third polarization is a linear combination of the adjusted first polarization and the adjusted second polarization;
wherein the optical combiner comprises:
a first transparent surface, wherein the first optical beam with a first polarization and the second optical beam with a second polarization enter the optical combiner at the first transparent surface;

a first reflective surface to reflect the first optical beam and rotate the first polarization to the adjusted first polarization, wherein the first optical beam propagates through the optical combiner from the first transparent surface to the first reflective surface;

a second reflective surface to reflect the second optical beam and rotate the second polarization to the adjusted second polarization, wherein the second optical beam propagates through the optical combiner from the first transparent surface to the second reflective surface, and wherein the second reflective surface is joined at an edge with the first reflective surface;

a partially reflective surface to combine the first beam with the adjusted first polarization and the second beam with the adjusted second polarization into the output beam; and at least one second transparent surface, wherein the output beam exits the optical combiner at the at least one second transparent surface.

10. The method of claim 9, wherein the first reflective surface lies at a first angle of approximately forty-five degrees to the first optical beam, wherein the second reflective surface lies at a second angle of approximately forty-five degrees to the second optical beam, wherein the first and second reflective surfaces are joined at an edge at a third angle of approximately ninety degrees, wherein the partially reflective surface lies between the edge joining the first and second reflective surfaces and the first transparent surface, and wherein a fourth angle between the partially reflective surface and the first transparent layer is approximately ninety degrees.

11. The method of claim 9, wherein digital or analog information is added to the third polarization by adjusting at least one of a phase or an amplitude of the first optical beam and the second optical beam.

12. The method of claim 11, wherein the digital or analog information is carried in a polarization of the third polarization.

13. The method of claim 9, wherein a free-space optical transceiver comprises the apparatus, and wherein the free-space optical transceiver communicates information to and from another free-space optical transceiver.

14. The method of claim 9, further comprising:
a user equipment, wherein the user equipment sends a message to a network indicating that the user equipment has an optical communication capability.

15. The method of claim 14, wherein the apparatus is further configured to receive an indication from a network node, wherein the indication enables optical communication between the user equipment and another device.

16. The method of claim 9, wherein the first reflective surface lies at a first angle acute to the first optical beam, and wherein the second reflective surface lies at a second angle acute to the second optical beam.

17. An apparatus comprising:
an optical combiner configured to combine a first optical beam having an adjusted first polarization with a second optical beam having an adjusted second polarization into an output beam having a third polarization, wherein the third polarization is a linear combination of the adjusted first polarization and the adjusted second polarization;
wherein the optical combiner comprises:
a first transparent surface, wherein the first optical beam with a first polarization and the second optical beam with a second polarization enter the optical combiner at the first transparent surface, wherein the first reflective surface lies at a first angle of approximately forty-five degrees to the first optical beam;

a first reflective surface to reflect the first optical beam and rotate the first polarization to the adjusted first polarization, wherein the first optical beam propagates through the optical combiner from the first transparent surface to the first reflective surface;

a second reflective surface to reflect the second optical beam and rotate the second polarization to the adjusted second polarization, wherein the second optical beam propagates through the optical combiner from the transparent surface to the second reflective surface, wherein the second reflective surface lies at a second angle of approximately forty-five degrees to the second optical beam, and wherein the first and second reflective surfaces are joined at an edge at a third angle of approximately ninety degrees;

a partially reflective surface to combine the first beam with the adjusted first polarization and the second beam with the adjusted second polarization into the output beam, wherein the partially reflective surface lies between the edge joining the first and second reflective surfaces and the first transparent surface, and wherein a fourth angle between the partially reflective surface and the first transparent layer is approximately ninety degrees; and at least one second transparent surface, wherein the output beam exits the optical combiner at the at least one second transparent surface.

\* \* \* \* \*